United States Patent
Hsu et al.

(10) Patent No.: US 9,626,106 B2
(45) Date of Patent: Apr. 18, 2017

(54) SYSTEM AND METHOD FOR MEMORY COMMAND QUEUE MANAGEMENT AND CONFIGURABLE MEMORY STATUS CHECKING

(71) Applicant: SanDisk Technologies Inc., Plano, TX (US)

(72) Inventors: Jonathan Hsu, Newark, CA (US); Daniel Tuers, Kapaa, HI (US); Tien-chien Kuo, Sunnyvale, CA (US)

(73) Assignee: SanDisk Technologies LLC, Plano, TX (US)

( * ) Notice: Subject to any disclaimer, the term of this patent is extended or adjusted under 35 U.S.C. 154(b) by 180 days.

(21) Appl. No.: 14/595,878

(22) Filed: Jan. 13, 2015

(65) Prior Publication Data

US 2016/0202914 A1 Jul. 14, 2016

(51) Int. Cl.
*G06F 11/00* (2006.01)
*G06F 3/06* (2006.01)
*G06F 11/07* (2006.01)

(52) U.S. Cl.
CPC .......... *G06F 3/0604* (2013.01); *G06F 3/0629* (2013.01); *G06F 3/0653* (2013.01); *G06F 3/0683* (2013.01); *G06F 11/073* (2013.01); *G06F 11/079* (2013.01); *G06F 11/0751* (2013.01)

(58) Field of Classification Search
CPC .................................................. G06F 11/073
USPC ...................................................... 714/49, 51
See application file for complete search history.

(56) References Cited

U.S. PATENT DOCUMENTS

| | | | | |
|---|---|---|---|---|
| 6,676,022 B1* | 1/2004 | Guthery | ............... | G06Q 20/341 235/380 |
| 6,766,467 B1* | 7/2004 | Neal | ................... | G06F 11/0727 714/5.11 |
| 8,099,529 B1* | 1/2012 | Overby | ................. | G06F 13/385 710/22 |
| 9,021,147 B1* | 4/2015 | Nguyen | .............. | G06F 11/1004 710/6 |
| 2006/0090167 A1* | 4/2006 | Keohane | ............ | G06F 9/45512 719/319 |
| 2007/0011360 A1* | 1/2007 | Chang | .................. | G06F 3/0613 710/5 |
| 2013/0060981 A1* | 3/2013 | Horn | ....................... | G06F 13/16 710/107 |
| 2014/0143463 A1* | 5/2014 | Mou | ..................... | G06F 11/349 710/110 |
| 2015/0277975 A1* | 10/2015 | Kelm | .................. | G06F 9/30043 711/146 |

* cited by examiner

*Primary Examiner* — Elmira Mehrmanesh
(74) *Attorney, Agent, or Firm* — Brinks Gilson & Lione

(57) ABSTRACT

Systems, apparatuses, and methods for command queue management and configurable memory status in a memory. A memory may include a controller and one or more memory integrated circuit chips, which each include memory arrays. The controller may send commands, such as read or write commands, to the one or more memory integrated circuit chips. The memory integrated circuit chips may maintain a command queue of the commands sent from the controller, thereby relieving the controller from such responsibility. Further, the memory integrated circuit chips may send an indication of an error in executing the commands, thereby relieving the controller from constant polling of the memory integrated circuit chips as to status.

18 Claims, 13 Drawing Sheets

| Command FIFO | 3 | 2 | 1 | 0 |
|---|---|---|---|---|
| | Z: Empty | Y: Binary Read block C | X: Binary program addr B | W: Program addr A |

Table 1. Command FIFO (where command depth is 4)

FIG. 5A

| | $IO_7$ | $IO_6$ | $IO_5$ | $IO_4$ | $IO_3$ | $IO_2$ | $IO_1$ | $IO_0$ |
|---|---|---|---|---|---|---|---|---|
| Definition | Operation Z status | Operation Y status | Operation X status | Operation W status | Operation Z pass/fail | Operation Y pass/fail | Operation X pass/fail | Operation W pass/fail |

Table 2. Status FIFO

FIG. 5B

SYSTEM AND METHOD FOR MEMORY COMMAND QUEUE MANAGEMENT AND CONFIGURABLE MEMORY STATUS CHECKING

TECHNICAL FIELD

This application relates generally to managing data in a system. More specifically, this application relates to a memory system controller managing command execution on one or more memory integrated circuit chips.

BACKGROUND

A memory system typically includes a memory controller in communication with one or more memory integrated circuit chips. The memory controller sends commands, such as write or read commands, to the memory integrated circuit chips for execution. The memory controller is able to monitor the execution of the commands by communicating, such as polling, with the memory integrated circuit chips.

BRIEF SUMMARY

According to one aspect, an integrated circuit chip is disclosed. The integrated circuit chip includes: a memory; a command receipt module configured to receive commands from a controller of a memory system; a command queue module configured to maintain a list of the commands; and a poll response module configured to send part or all of the list of commands in response to receipt of a poll command from the controller.

According to another aspect, a controller for a memory system is disclosed. The controller includes: a communication module configured to communicate with one or more memory integrated circuit chips; command generation module configured to generate and send, via the communication module, one or more commands to a memory integrated circuit chip; and error determination module configured to receive, via the communication module, a communication indicative of an error and to determine, based on the communication, whether an error has occurred in execution of any of the one or more commands, wherein the communication is not in response to polling by the controller of the memory integrated circuit chip.

According to still another aspect, an integrated circuit chip is disclosed. The memory integrated circuit chip includes: a memory; a command receipt module configured to receive a command from a controller of a memory system; an execution module configured to execute the command received via the command receipt module; an error determination module configured to determine an error in execution of the command; and a communication generator configured to, in response to the error determination module determining an error in execution of the command, generate and send a communication indicative to the controller that the error has occurred.

Other features and advantages will become apparent upon review of the following drawings, detailed description and claims. Additionally, other embodiments are disclosed, and each of the embodiments can be used alone or together in combination. The embodiments will now be described with reference to the attached drawings.

BRIEF DESCRIPTION OF THE DRAWINGS

The system may be better understood with reference to the following drawings and description. In the figures, like reference numerals designate corresponding parts throughout the different views.

FIG. 5A illustrates a table of commands as stored in a memory chip.

FIG. 5B illustrates a table of the status and pass/fail for commands as stored in a memory chip.

DETAILED DESCRIPTION

Figure 1A:
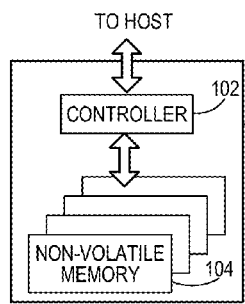
FIG. 1A is a block diagram of an example non-volatile memory system.

As discussed in the background, the memory system may include a controller in communication with non-volatile memory. The non-volatile memory may comprise one or more memory integrated circuit chips. The controller sends multiple commands to the memory integrated circuit chips. Commands may have different priorities of execution. For example, if the commands received by the memory integrated circuit chip have the same priority of execution, the commands are executed in the order in which they are received at the memory integrated circuit chip. As another example, if the commands received by the memory integrated circuit chip have different priorities of execution, the memory integrated circuit chip may suspend execution of a command with a lower priority in favor of execution of execution of a command with a higher priority. After completing execution of the command with the higher priority, the memory integrated circuit chip may resume execution of the command with the lower priority.

Typical memory integrated circuit chips are incapable of reporting to the controller the sequence of execution of commands. Since the typical memory integrated circuit chips lack the intelligence, the controller must track the sequence of execution of commands on the memory integrated circuit chips. Further, the typical memory integrated circuit chips are incapable of reporting an error to the controller. Rather, to determine whether there is an error, the controller must communicate with the memory integrated circuit chips in order to determine whether an error has occurred. For example, the controller may send commands to the memory integrated circuit chips and, thereafter, constantly poll the memory integrated circuit chips. In response to the polls, the memory integrated circuit chips report the status, which may be used by the controller to determine whether there is an error. Thus, due to a lack of functionality on the typical memory integrated circuit chips, the controller needs to: (1) monitor the sequence of command execution; and (2) actively communicate with (such as poll) the memory integrated circuit chips in order to determine whether there is an error.

Typically, commands are successfully executed more than 99.99% of the time. In fact, the failure rate is on the order of $1 \times 10^{-6}$. Thus, instead of a status poll-driven determination of error (in which the status of execution of every command is checked), in one embodiment, an error-driven determination is implemented. In a more specific embodiment, the status is checked in response to the error determination. As discussed in more detail below, when a failure is detected, processing is abruptly stopped and the current state of command execution is analyzed. More specifically, when the abrupt stop occurs, the controller may poll the memory integrated circuit chip, and in response to the poll, receive the command queue and/or the status for commands in the command queue.

To that end, in one embodiment, the memory integrated circuit chip is configured to report the sequence of execution of commands, as discussed in more detail below. For example, the memory integrated circuit chip may provide a listing of the commands in the queue and may provide a status of the commands in the queue. In an alternate embodiment, the memory integrated circuit chip is configured to report an error to the controller. The reporting of the error is not in response to a poll by the controller. As discussed in more detail below, the memory integrated circuit chip may report the error in one of several ways, such as using the RDY/BSY line, a dedicated line, or the I/O communication lines. In still an alternate embodiment, the memory integrated circuit chip is configured both to report the sequence of execution of commands and to report an error to the controller.

FIG. 1A is a block diagram illustrating a non-volatile memory system. The non-volatile memory system 100 includes a controller 102 and non-volatile memory that may be made up of one or more non-volatile memory die 104. As used herein, the term die refers to the set of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a flash memory controller) can take the form of processing circuitry, a microprocessor or processor, and a computer-readable medium that stores computer-readable program code (e.g., software or firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a flash memory controller is a device that manages data stored on flash memory and communicates with a host, such as a computer or electronic device. A flash memory controller can have various functionality in addition to the specific functionality described herein. For example, the flash memory controller can format the flash memory to ensure the memory is operating properly, map out bad flash memory cells, and allocate spare cells to be substituted for future failed cells. Some part of the spare cells can be used to hold firmware to operate the flash memory controller and implement other features. In operation, when a host needs to read data from or write data to the flash memory, it will communicate with the flash memory controller. If the host provides a logical address to which data is to be read/written, the flash memory controller can convert the logical address received from the host to a physical address in the flash memory. (Alternatively, the host can provide the physical address). The flash memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including NAND flash memory cells and/or NOR flash memory cells. One example of non-volatile memory die 104 may comprise a memory integrated circuit chip. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, memory system 100 may be a card based system, such as a secure digital (SD) or a micro secure digital (micro-SD) card. In an alternate embodiment, memory system 100 may be part of an embedded memory system.

Although in the example illustrated in FIG. 1A non-volatile memory system 100 includes a single channel between controller 102 and non-volatile memory die 104, the subject matter described herein is not limited to having a single memory channel. For example, in some NAND memory system architectures such as illustrated in FIGS. 1B-C, 2, 4, 8 or more NAND channels may exist between the controller and the NAND memory device, depending on controller capabilities. In any of the embodiments described herein, more than a single channel may exist between the controller and the memory die, even if a single channel is shown in the drawings.

Figure 1B:
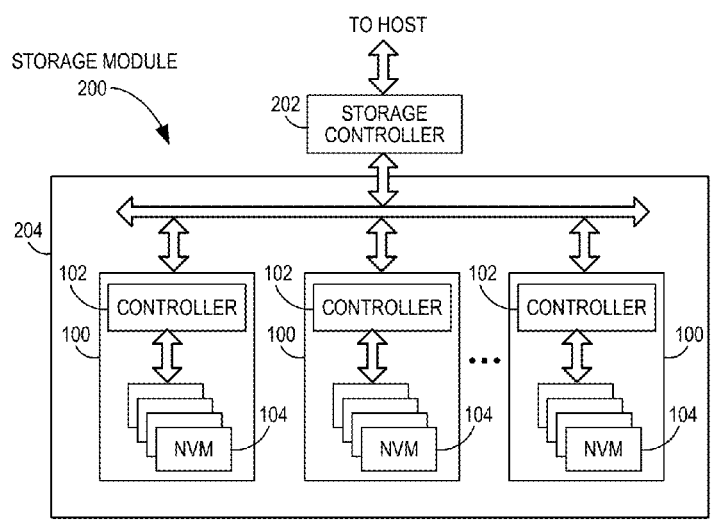
FIG. 1B is a block diagram illustrating an exemplary storage module.

FIG. 1B illustrates a storage module 200 that includes plural non-volatile memory systems 100. As such, storage module 200 may include a storage controller 202 that interfaces with a host and with storage system 204, which includes a plurality of non-volatile memory systems 100.

The interface between storage controller 202 and non-volatile memory systems 100 may be a bus interface, such as a serial advanced technology attachment (SATA) or peripheral component interface express (PCIe) interface. Storage module 200, in one embodiment, may be a solid state drive (SSD), such as found in portable computing devices, such as laptop computers, and tablet computers.

Figure 1C:
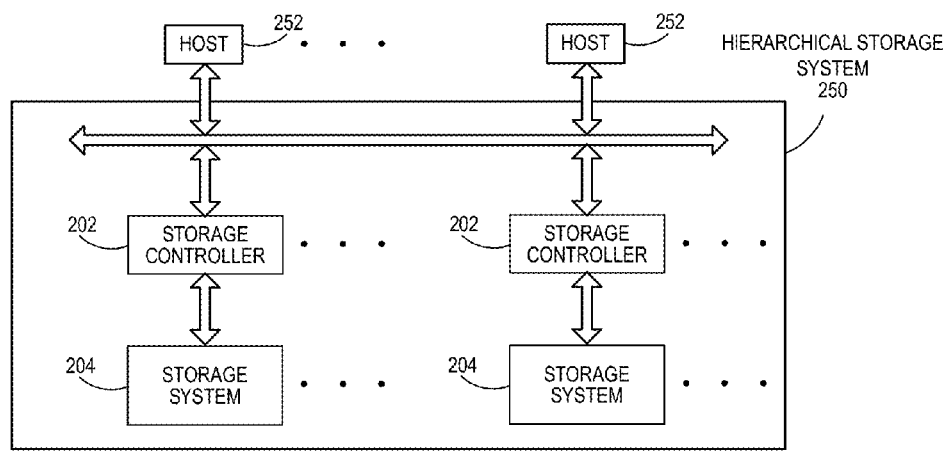
FIG. 1C is a block diagram illustrating a hierarchical storage system.

FIG. 1C is a block diagram illustrating a hierarchical storage system. A hierarchical storage system 210 includes a plurality of storage controllers 202, each of which control a respective storage system 204. Host systems 212 may access memories within the hierarchical storage system via a bus interface. In one embodiment, the bus interface may be a non-volatile memory express (NVMe) or a fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
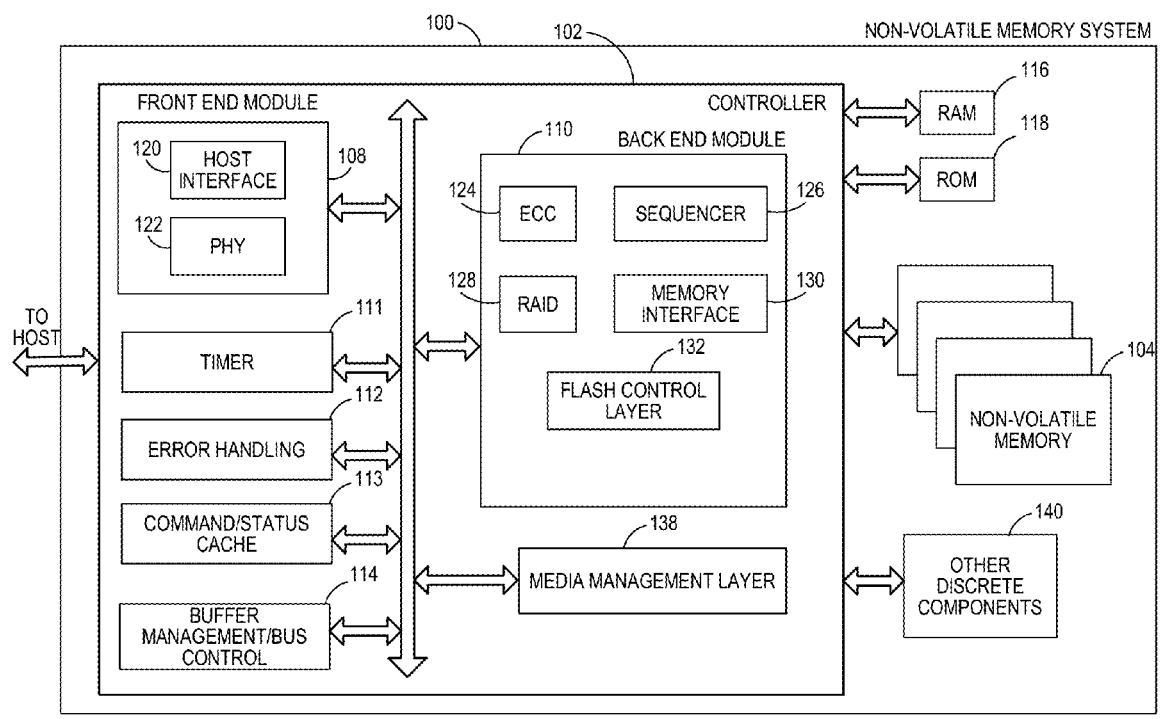
FIG. 2A is a block diagram illustrating exemplary components of a controller of a non-volatile memory system.

FIG. 2A is a block diagram illustrating exemplary components of controller 102 in more detail. Controller 102 includes a front end module 108 that interfaces with a host, a back end module 110 that interfaces with the one or more non-volatile memory die 104, and various other modules that perform functions which will now be described in detail.

A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example.

Modules of the controller 102 may include a timer module 111, error handling module 112, and command/status cache module 113. As explained in more detail below, the timer module 111 may perform timing operations to determine whether a communication, such as via RDY/BSY, is indicative of an error. The error handling module 112 may perform analysis to determine whether an error has occurred and operations in response to determining that an error has occurred. The command/status cache module 113 may comprise a cache which stores commands currently executed by the non-volatile memory die 104, such as one or more of the memory chips, and the associated status. The command/status cache module 113 may be populated based on responses to command/status polls to the non-volatile memory die 104. While in some implementations the timer module 111, the error handling module 112, and the command/status cache module 113 are part of the controller as described above, in other implementations, all or a portion of the timer module 111, the error handling module 112, and the command/status cache module 113 may be discrete components, separate from the controller 102, that interface with the controller 102.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller. Further, in some implementations, the controller 102, RAM 116, and ROM 118 may be located on separate semiconductor die.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, SAS, Fibre Channel, USB, PCIe, and NVMe. The host interface 120 typically facilitates transfer for data, control signals, and timing signals.

Back end module 110 includes an error correction controller (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the non-volatile memory system 100. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

Additional components of system 100 illustrated in FIG. 2A include media management layer 138, which performs wear leveling of memory cells of non-volatile memory die 104. System 100 also includes other discrete components 140, such as external electrical interfaces, external RAM, resistors, capacitors, or other components that may interface with controller 102.

In alternative embodiments, one or more of the physical layer interface 122, RAID module 128, media management layer 138 and buffer management/bus controller 114 are optional components that are not necessary in the controller 102.

Figure 2B:
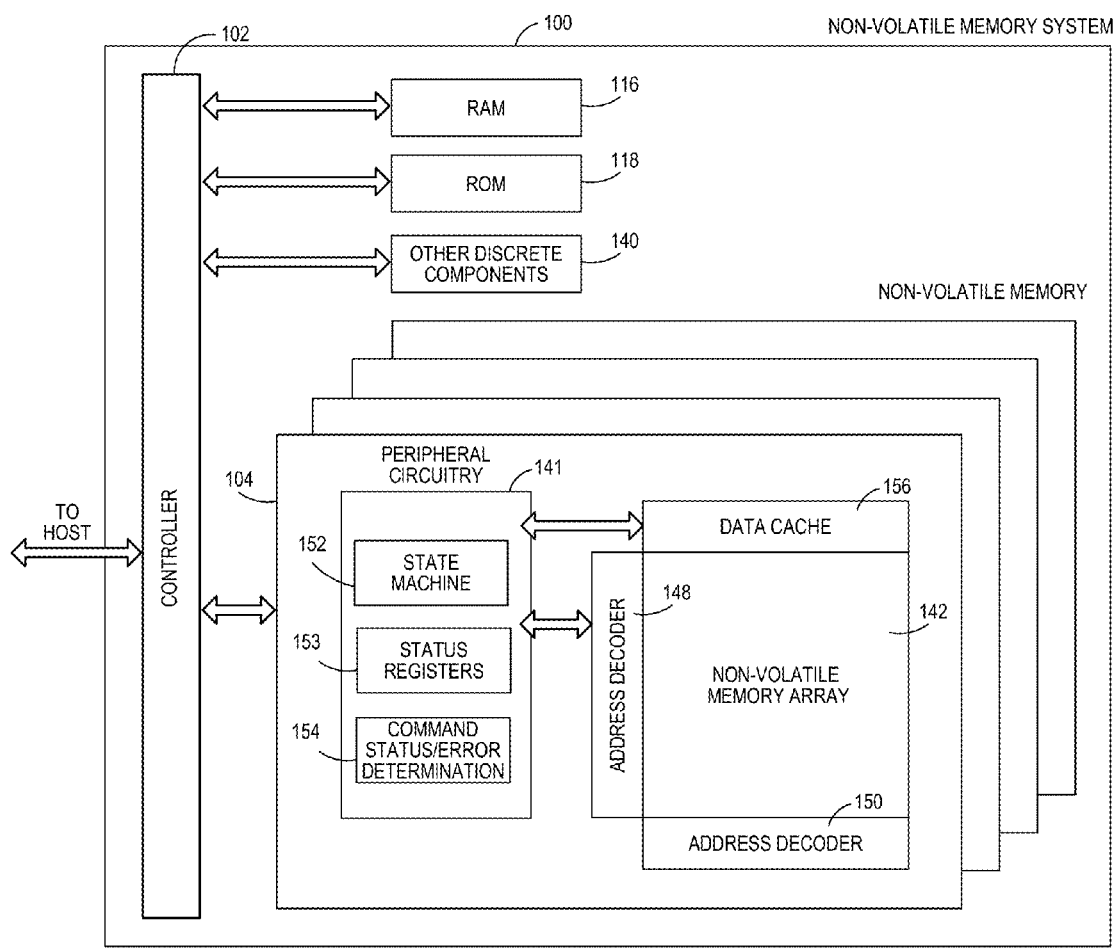
FIG. 2B is a block diagram illustrating exemplary components of a non-volatile memory of a non-volatile memory storage system.

FIG. 2B is a block diagram illustrating exemplary components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including NAND flash memory cells and/or NOR flash memory cells in a two dimensional and/or three dimensional configuration. Peripheral circuitry 141 includes a state machine 152 that provides status information to controller 102. Peripheral circuitry 141 further includes status registers 153. Status registers 153 may comprise various status registers indicative of the execution of commands, such as illustrated in FIGS. 5A-B. Peripheral circuitry 141 also may include command status/error determination 154. Command status/error determination 154 may be configured to perform various command monitoring functionality, including without limitation, updating status registers 153, error determination when executing commands, and, in response to determination of an error, control of signals (such as on RDY/BSY line) to indicate to the controller 102 an error has occurred. In this regard, command status/error determination 154 may include functionality separate from error correction coding. Non-volatile memory die 104 further includes address decoders 148, 150 for addressing within non-volatile memory array 142, and a data cache 156 that caches data.

Figure 2C:
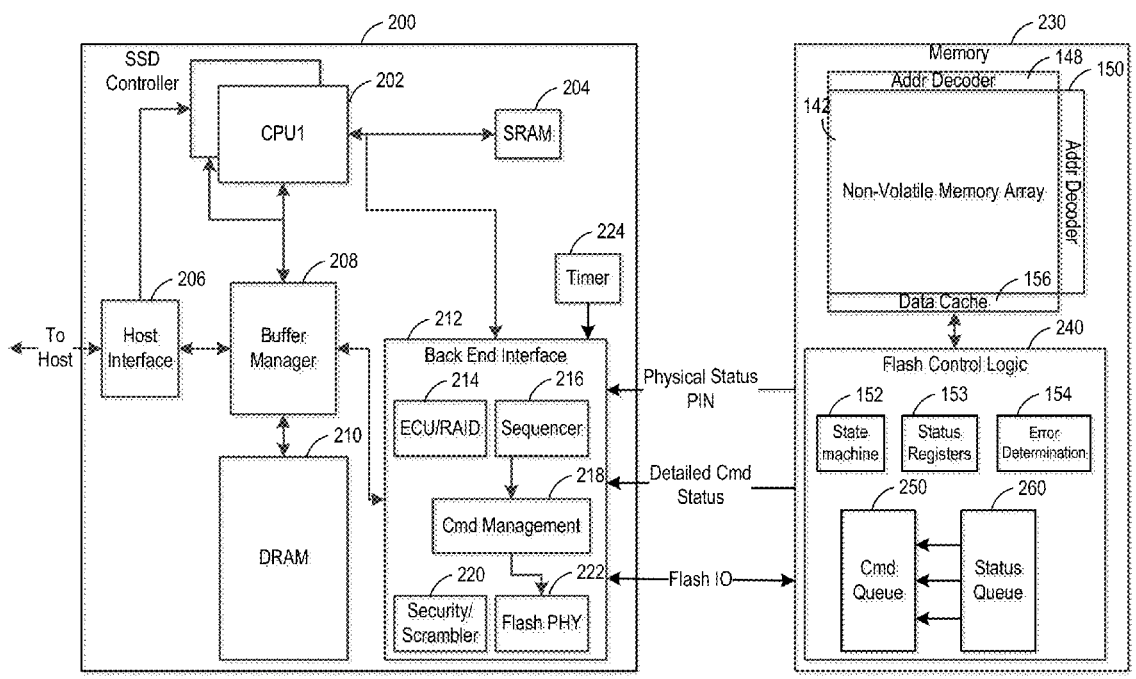
FIG. 2C is a block diagram illustrating an SSD system including an SSD controller 200 and non-volatile memory 230

FIG. 2C is a block diagram illustrating an SSD system including an SSD controller 200 and non-volatile memory 230. SSD controller 200 includes one or more central processing units (CPU$_1$ to CPU$_N$) 202. Further, SSD controller 200 includes RAM (such as SRAM 204 and DRAM 210), host interface 206 (in order to electrically interface with the host device), and buffer manager 208. SSD controller 200 also includes back end interface 212, which may comprise ECU/RAID 214 (which may include error correction and redundant memory), sequencer 216 (which may generate command sequences), command management 218 (which may include functionality similar to error handling 113 and command/status cache 114), security/scrambler 220 (for secure communications with non-volatile memory 230), and flash PHY 222 (which provides the electrical interface with the non-volatile memory 230). SSD controller 200 further includes timer 224, which may be used to determine whether an error has occurred on non-volatile memory 230, as discussed in more detail below. One example of timer 224 is a clock.

Non-volatile memory 230 includes address decoders 148, 150 for addressing within non-volatile memory array 142, and a data cache 156 that caches data. Non-volatile memory 230 further includes flash control logic 240, which comprises state machine 152, status registers 153, and error determination 154. Flash control logic 240 further includes command queue 250 and status queue 260, examples of which are illustrated in FIGS. 5A-B.

FIG. 2C further illustrates electrical connections between SSD controller 200 and non-volatile memory 230, including physical status PIN, detailed Cmd status, and flash I/O. Flash I/O may comprise a plurality of bi-directional lines, which may communicate data to/from non-volatile memory 230.

In one embodiment, physical status PIN may comprise a single RDY/BSY line, which may comprise a uni-directional line to indicate whether part or all of non-volatile memory 230 is ready or busy. More specifically, the RDY/BSY line may indicate ready (RDY) when part or all of non-volatile memory 230, such as one of the memory chips in non-volatile memory 230, has a free slot in the command queue and is ready to accept another command. In this regard, flash control logic 240 may determine whether the status queue 260 indicate readiness to accept another command and set the RDY/BSY line accordingly.

In addition to signaling readiness of the memory chip, the RDY/BSY line may be used for another purpose, namely to indicate whether part or all of non-volatile memory 230 has an error (such as an error in one of the memory chips of non-volatile memory 230 in executing a command sent from the SSD controller 200). As discussed in more detail below, non-volatile memory 230 may communicate an error to the SSD controller 200, such as via the RDY/BSY line. One of the memory chips in non-volatile memory 230 may configure signals on the RDY/BSY line to indicate an error, with the SSD controller 200 interpreting the signals on the RDY/BSY line to identify that an error has occurred.

In operation, in response to flash control logic 240 determining that an error has occurred in any operation listed in the command queue 260, flash control logic 240 may keep the RDY/BSY line to indicate busy (BSY) even if flash control logic 240 is capable of accepting another command. In this regard, SSD controller 200, using timer 224, may determine whether the RDY/BSY line indicates BSY longer than the busy timeout. If so, the SSD controller 200 determines that an error has occurred in non-volatile memory 230. Since the frequency of errors is typically very low, keeping the RDY/BSY line to indicate BSY for at least a predetermined timeout has little or no effect on performance.

As discussed above, the flash control logic 240 may generate the signal on the RDY/BSY line to signal whether part or all of non-volatile memory 230, such as a memory chip, is ready or busy to accept another command. In one embodiment, the flash control logic 240 controls a single die. In this instance, the flash control logic 240 may include a single command queue for the single die (see FIG. 5A) and an associated status (see FIG. 5B). In practice, the single die may send a signal to the flash control logic 240 (indicating readiness or business of the single die to accept another command). Further, the flash control logic 240 may generate the RDY/BSY signal based on the signal generated by the single die for transmission to the SSD controller 200. In response to an indication of readiness, the SSD controller 200 will send another command to the non-volatile memory 230.

In an alternate embodiment, the flash control logic 240 controls a plurality of dice (such as a first die and a second die). In this instance, the flash control logic 240 may include a respective command queue for each of the plurality of dice, and an associated status for each respective command queue. Likewise, in practice, the plurality of die may each send a signal to the flash control logic 240 (indicating readiness or business of the respective die to accept another command). For example, the first die may send a first signal indicating readiness or business of the first die to accept another command and the second die may send a second signal indicating readiness or business of the second die to accept another command. In one embodiment, the flash control logic 240 may logically OR the respective signals as to readiness/business from the plurality of dice to generate the RDY/BSY signal. In this regard, if any one of the plurality of dies sends a signal indicating readiness, the RDY/BSY signal generated by the flash control logic 240 will indicate to the SSD controller 200 readiness to accept another command. In response to determining that the RDY/BSY signal indicates readiness, the SSD controller 200 may send a command. In response to receipt of the command, the flash control logic 240 may determine which die, from the plurality of dice, is ready to accept another command, and may send the command to the ready die.

In the event that an error occurs in non-volatile memory 230, a signal is generated on the RDY/BSY line that indicates to the SSD controller 200 a failure. More specifically, when any die on the memory chip in non-volatile memory 230 has operation failure, it enables a strong pull-down path for the RDY/BSY line to override the pull-up path indicating readiness on each ready die. In one embodiment, an error indication on the die directly results in the pull-down path for the RDY/BSY line. In an alternative embodiment, the error indication on the die is sent to the flash control logic 240, which in turn pulls-down the RDY/BSY line. In this regard, after pull-down of the RDY/BSY line, the RDY/BSY line will be low. To avoid high fighting current, the flash control logic 240 may implement a circuit to cut off a pull-up path on the RDY/BSY line (on the ready dice) when the error event is detected.

The RDY/BSY line will thus be kept low by the failing die. After a predetermined time, such as a time-out period, the SSD controller 200 will recognize that some operation has failed and may begin to check which die has failed. In one embodiment, the predetermined time may be a busy time of all commands in the queue of a single die, though not the sum of all dice. When the failure has been cleared up, the flash control logic 240 may unlock the RDY/BSY line.

Thus, in response to setting the RDY/BSY line to indicate an error, the controller 102, such as SSD controller 200, determines that an error has occurred in the non-volatile memory die 104, such as one of the memory chips in non-volatile memory 230. In response to determination of the error, the controller 102 may poll the memory chip with the error. The poll may request one, some, or all of the following: the command queue (such as illustrated in FIG. 5A), the status of the individual commands (such as illustrated in FIG. 5B), and the pass/fail of the individual commands (such as illustrated in FIG. 5B).

As discussed above, non-volatile memory die 104 may include a plurality of dice. Further, in one embodiment, the controller 102 may only determine that there is an error in part of non-volatile memory die 104, not determine that there is an error on a specific die (amongst the plurality of dice). In this instance, when polling the memory chip with the error, the controller 102 may also include an indication as to the die. In an example of a first die and a second die in which the first die has blocks 0 to 800 and the second die has blocks 801 to 1600, the controller 102 may send two polls, with the first poll indicating part (or all) of the address for the first die and the second poll indicating part (or all) of the address for the second die. In this regard, the non-volatile memory die 104 may receive the first poll, determine that the poll is for the first die (based on the address indicated in the first poll), access the status register(s), such as status queue 260, for the first die, and send the status for the first die responsive to the first poll. Likewise, the non-volatile memory die 104 may receive the second poll, determine that the poll is for the second die (based on the address indicated in the second poll), access the status register(s) for the second die, and send the status for the second die responsive to the second poll. The controller 102 may review the status for each of the respective die in order to determine which die experienced the error.

Figure 3A:
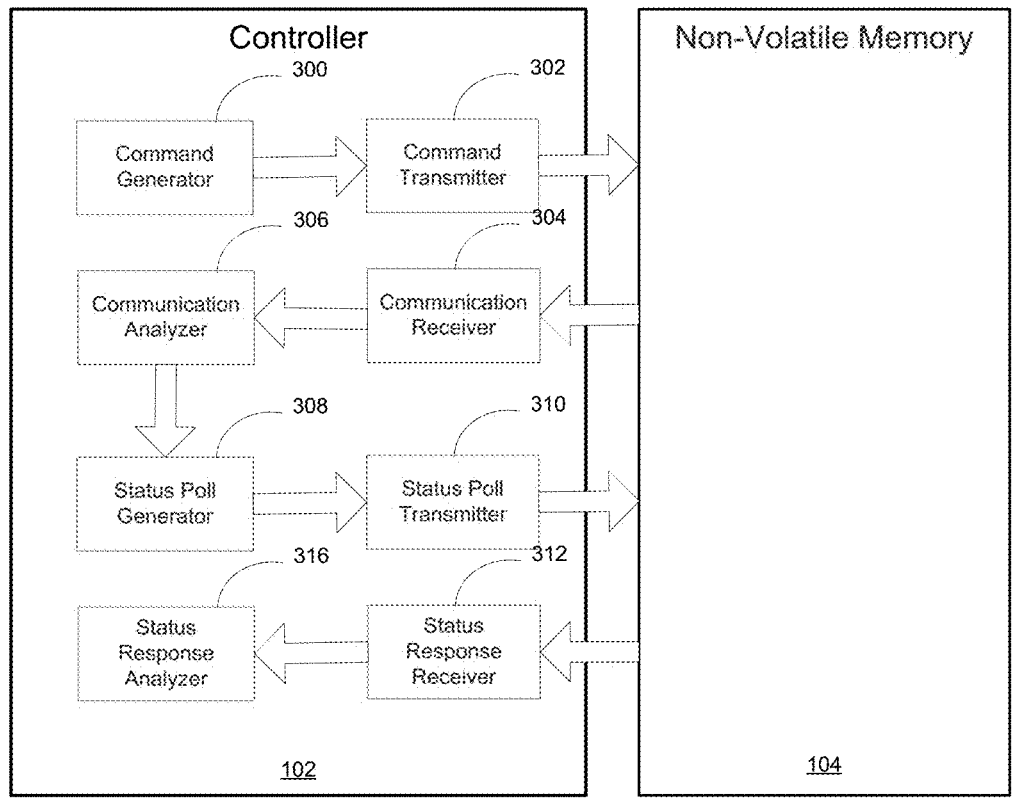
FIG. 3A illustrates another block diagram of the controller and the non-volatile memory of FIG. 1A.

FIG. 3A illustrates another block diagram of the controller 102 and the non-volatile memory die 104 of FIG. 1A. As shown in FIG. 3A, in one embodiment, the controller 102 can be configured with a command generator 300, a command transmitter 302, a communication receiver 304, and a communication analyzer 306. As mentioned above, any one, any combination, or all of the command generator 300, the command transmitter 302, the communication receiver 304, and the communication analyzer 306 can be implemented as hardware or firmware, or a combination of hardware and firmware inside the controller 102 or can be implemented as a component outside of the controller 102.

The command generator 300 is configured to generate one or more commands to send to the non-volatile memory die 104. The command transmitter 302 is configured to transmit the commands generated by the command generator 300. The communication receiver 304 is configured to receive one or more communications from the non-volatile memory die 104. The communication(s) may be indicative to the controller 102 of an error occurring in one of the non-volatile memory die 104. For example, the communication may be sent from non-volatile memory die 104 without a poll by the controller 102. Instead, the communication may be sent responsive to determination by the non-volatile memory die 104 of an error in execution of the command. In this regard, the trigger for sending the communication is not dependent on an action (such as a poll) by the controller 102. Instead, the trigger for sending the communication is the determination by the non-volatile memory die 104 that an error has occurred. The communication analyzer 306 is configured to analyze the communication(s) to determine whether an error has occurred in one of the non-volatile memory die 104.

In response to the communication analyzer 306 determining that an error has occurred, the status poll generator 308 may generate a status poll, for transmission by the status poll transmitter 310. In response to transmitting the status poll, the status response receiver 312 may receive the status response, which may be analyzed by the status response analyzer 314. As discussed in more detail below, the non-volatile memory die 104 may generate a status response that includes a list or a sequence of the commands for execution, a status of the commands, and a pass/fail indication of the commands. Because the non-volatile memory die 104 may report the sequence of the commands for execution, the status of the commands, and/or the pass/fail indication of the commands, the controller 102 need not expend resources generating this information.

Figure 3B:
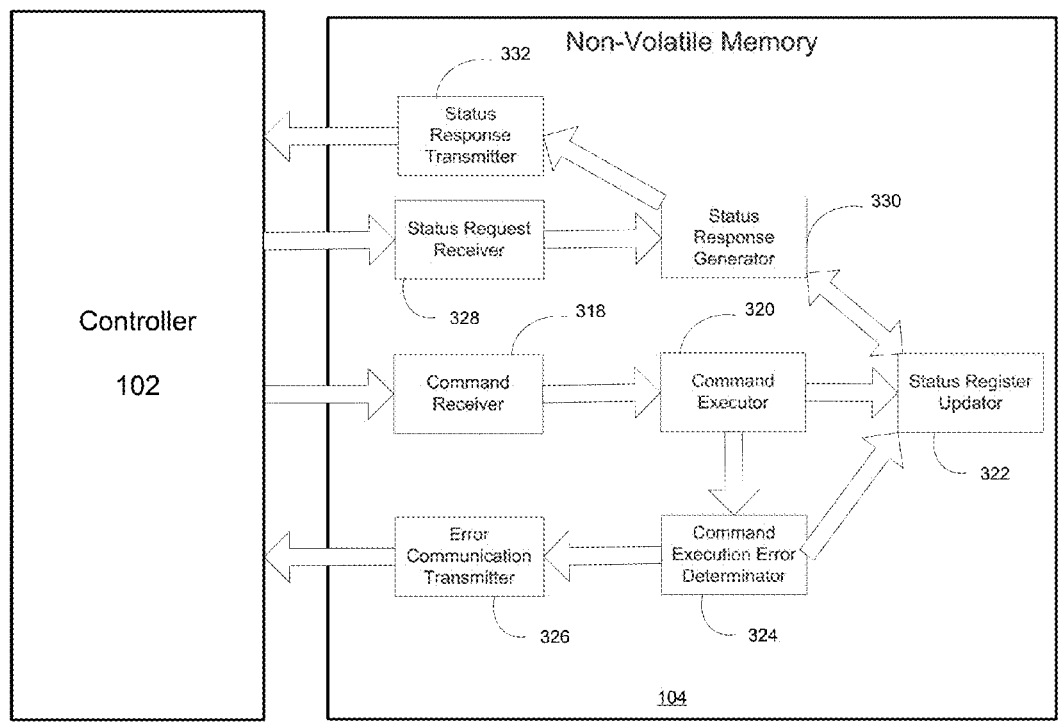
FIG. 3B illustrates still another block diagram of controller and the non-volatile memory of FIG. 1A.

FIG. 3B illustrates another block diagram of controller 102 and non-volatile memory die 104 of FIG. 1A. As shown in FIG. 3B, in one embodiment, the non-volatile memory die 104 can be configured with a command receiver 318, a command executor 320, a status register updator 322, a command execution error determinator 324, an error communication transmitter 326, a status request receiver 328, a status response generator 330, and a status response transmitter 332. As mentioned above, any one, any one, any combination, or all of the command receiver 318, the command executor 320, the status register updator 322, the command execution error determinator 324, the error communication transmitter 326, the status request receiver 328, the status response generator 330, and the status response transmitter 332 can be implemented as firmware, hardware, or a combination of hardware and firmware inside the non-volatile memory die 104 or can be implemented as a component outside of the non-volatile memory die 104.

The command receiver 318 is configured to receive the command from the controller 102. In response to receiving the command, the command executor 320 executes the command. Execution of the command may result in the status register updator 322 updating one or more status registers. Examples of status registers are discussed below in FIGS. 5A-B. Further, the execution of the command is monitored by the command execution error determinator 324 in order to determine if an error has occurred. In response to determining by the command execution error determinator 324 that an error has occurred, the error communication transmitter 326 may send a communication indicative of an error to the controller 102. In addition, in response to determining by the command execution error determinator 324 that an error has occurred, one or more status registers may be updated by the status register updator 322.

As discussed above with respect to FIG. 3A, in response to receiving a communication indicative of an error, the controller 102 may send a status poll, which may be received by the status request receiver 328. In response to receipt of the poll, the status response generator 330 may generate a status response, which may include part or all of the contents of the status register, for transmission by the status response transmitter 332. For example, the status response may comprise a sequence of the commands for execution, a status of the commands, and a pass/fail indication of the commands.

Figure 4A:
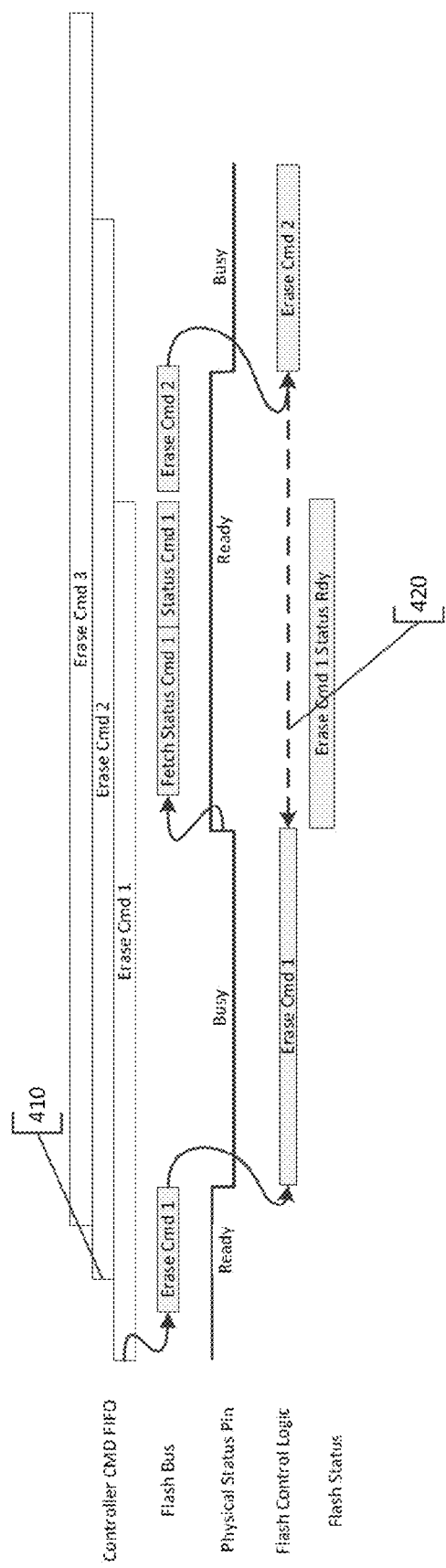
FIG. 4A is a timing diagram illustrating the processing of multiple commands with polling by the controller of the non-volatile memory.

FIG. 4A is a timing diagram 400 illustrating the processing of multiple commands with polling by the controller of the non-volatile memory. At 410, the timing diagram 400 illustrates that the Controller CMD FIFO receiving multiple commands. For example, three erase commands (Erase Cmd 1, Erase Cmd 2, and Erase Cmd 3) are received. In the timing diagram of FIG. 4A, the Erase Cmd 2 arrives after the CPU processes the command and builds the descriptor. As shown in timing diagram 400, the erase command is sent from the Controller CMD FIFO via flash bus to flash control logic 240, whereby flash control logic 240 may execute the erase command as indicated by Erase Cmd 1. While the flash control logic 240 is executing Erase Cmd 1, the physical status pin (such as RDY/BSY pin) indicates busy.

As discussed above, the controller 102 may poll the non-volatile memory die 104 for the status of commands being executed by the non-volatile memory. More specifically, in response to the poll, the status of Cmd 1 is fetched and sent. During this time, the flash status indicates that Erase Cmd 1 is completed. Thus, responding to the poll results in delay, as illustrated by delay 420, between where the non-volatile memory die 104, such as the flash die, becomes ready and where the controller 102 fetches the status and issues the next erase command. In this regard, polling by the controller 102 may result in an inefficiency.

Figure 4B:
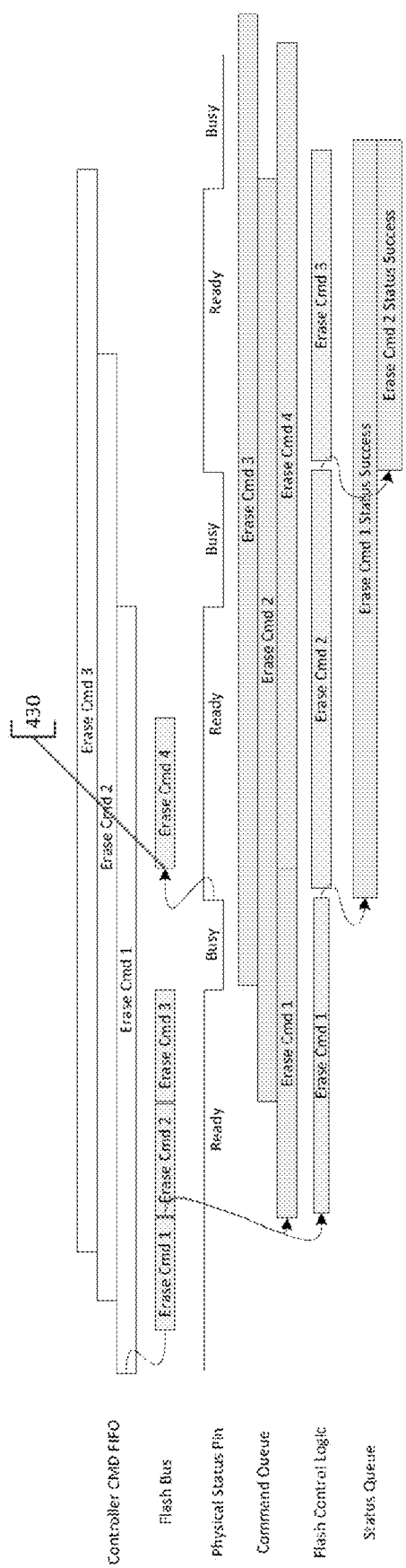
FIG. 4B is a timing diagram illustrating the processing of multiple commands without polling by the controller of the non-volatile memory.

FIG. 4B is a timing diagram 425 illustrating the processing of multiple commands without polling by the controller of the non-volatile memory. Similar to FIG. 4A, the Controller CMD FIFO receiving multiple commands. The multiple commands are sent via the flash bus to the command queue and to the flash control logic. In one embodiment, the command queue may be part of flash control logic, such as illustrated in FIG. 2C. Alternatively, the command queue may be separate from flash control logic. Regardless, the command queue may include a sequence of the commands in the queue. For example, FIG. 4B illustrates that the command queue is updated to illustrates the sequence of commands for execution is Erase Cmd 1, Erase Cmd 2, and Erase Cmd 3. Flash control logic executes Erase Cmd 1. When non-volatile memory cannot accept additional commands, the physical status pin (such as RDY/BSY pin) indicates busy. Further, upon determining that Erase Cmd 1 was successfully executed, the status queue may indicate a status of success for Erase Cmd 1.

Because the flash control logic does not need to respond to a poll from controller 102, after the flash control logic completes execution of Erase Cmd 1 and updates the statue queue with the status for Erase Cmd 1, the flash control logic may execute Erase Cmd 2. Further, in the "plan for success" mode whereby the controller 102 assumes success unless notified of an error by the non-volatile memory, the non-volatile memory becoming ready means that upon successful execution of a command, another command may be inserted into the queue, such as at 430 where Erase Cmd 4 may be inserted into the command queue. In the event that controller 102 wishes to know the status of execution of the commands (even without notification of an error by non-volatile memory die 104), the controller 102, may poll the non-volatile memory die 104 for the status.

Figure 4C:
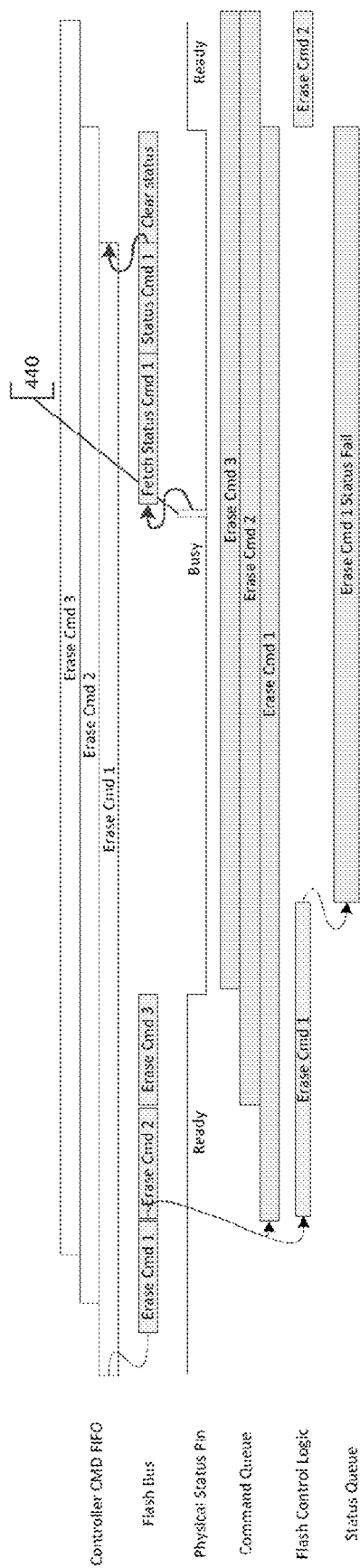
FIG. 4C is a timing diagram illustrating the processing of multiple commands with the non-volatile memory reporting an error without the controller polling the non-volatile memory.

FIG. 4C is a timing diagram 435 illustrating the processing of multiple commands with the non-volatile memory reporting an error without the controller polling the non-volatile memory. During execution of Erase Cmd 1, the flash control logic may determine that an error has occurred, and may direct the status queue to indicate the Erase Cmd 1 status fail. In response to the identification of the error, the flash control logic may maintain the physical status pin to the busy level. As discussed above, in response to the controller 102 determining that the physical status pin has been set to busy more than a predetermined amount of time (e.g., a time out waiting for the ready), the controller 102 determines that an error has occurred. At 440, the controller 102 sends a request for the status. In response to the request for the status, the flash bus fetches the status for command 1, and clears the status. In response to sending the status to the controller 102 and clearing the status, the physical status pin may then be reset to ready and the flash control logic may execute the next command, which as shown in FIG. 4C is Erase Cmd 2.

Thus, non-volatile memory die 104 may be configured to store a list of commands that are currently in the queue, such as currently being executed or scheduled for execution. In this regard, non-volatile memory die 104 may maintain a command queue FIFO that keeps all the commands in the pipe. Operations that do not report status typically finish immediately and hence, in one embodiment, need not be tracked in the command queue. FIG. 5A illustrates an example of the command queue FIFO. In one example, the command queue FIFO may support up to 3 bit cache, with a latch depth, 1 bit per set of NAND data latches.

As illustrated in FIG. 5A, the command FIFO has a command depth of 4 commands, illustrated in order of sequence as "W", "X", "Y", and "Z". In the example shown in FIG. 5A, each of the commands is performing a data command, interacting with a set of latches. Further, the command depth (shown as 4) and the latch depth are independent of one another. In addition, three commands are in the queue as "Program Address A", "Binary Program Address B" and "Binary Read block C". The memory chip of the non-volatile memory may report the data as indicated in FIG. 5A responsive to a poll from the controller 102.

In addition to the command queue, various aspects of the commands, such as the status and/or pass/fail, for the commands in the queue may be maintained. FIG. 5B illustrates a table of the status and pass/fail for commands as stored in a memory chip. Similar to FIG. 5A, FIG. 5B supports a command depth of 4. Other numbers of command depths are contemplated. In this regard, multiple status bits registers allow the memory chips to report the status, such as responsive to a poll from controller 102, for each command in the pipe, and a status table corresponding to the order in the command queue.

When execution of the command is completed, one or more of the registers may be updated. For example, the memory chip may update the command queue register, such as illustrated in FIG. 5B, to update the status bit (IO4-IO7) to indicate completion. In the event that execution of the command results in an error, the memory chip may update the pass/fail bit (see IO0-IO3) accordingly.

As discussed above, the order of commands in the queue may change, such as during a suspend/resume sequence. In response to a change in the order, the non-volatile memory die 104 may update one or more of status registers 153. For example, the order of the commands in the command queue (such as illustrated in FIG. 5A) may be changed. As another example, the status register (such as illustrated in FIG. 5B) may be changed.

Thus, various statuses may be reported from the non-volatile memory die 104 to the controller 102. In one embodiment, the non-volatile memory die 104 may report back to the controller 102 data such as illustrated in FIGS. 5A-B. Alternatively, the non-volatile memory die 104 may report back to the controller 102 less detail, responsive to a poll by the controller 102 for completion status. For example, the completion status poll may simply indicate current operation status, previous operation status, business of the memory chip and business of the cache.

Figure 6:
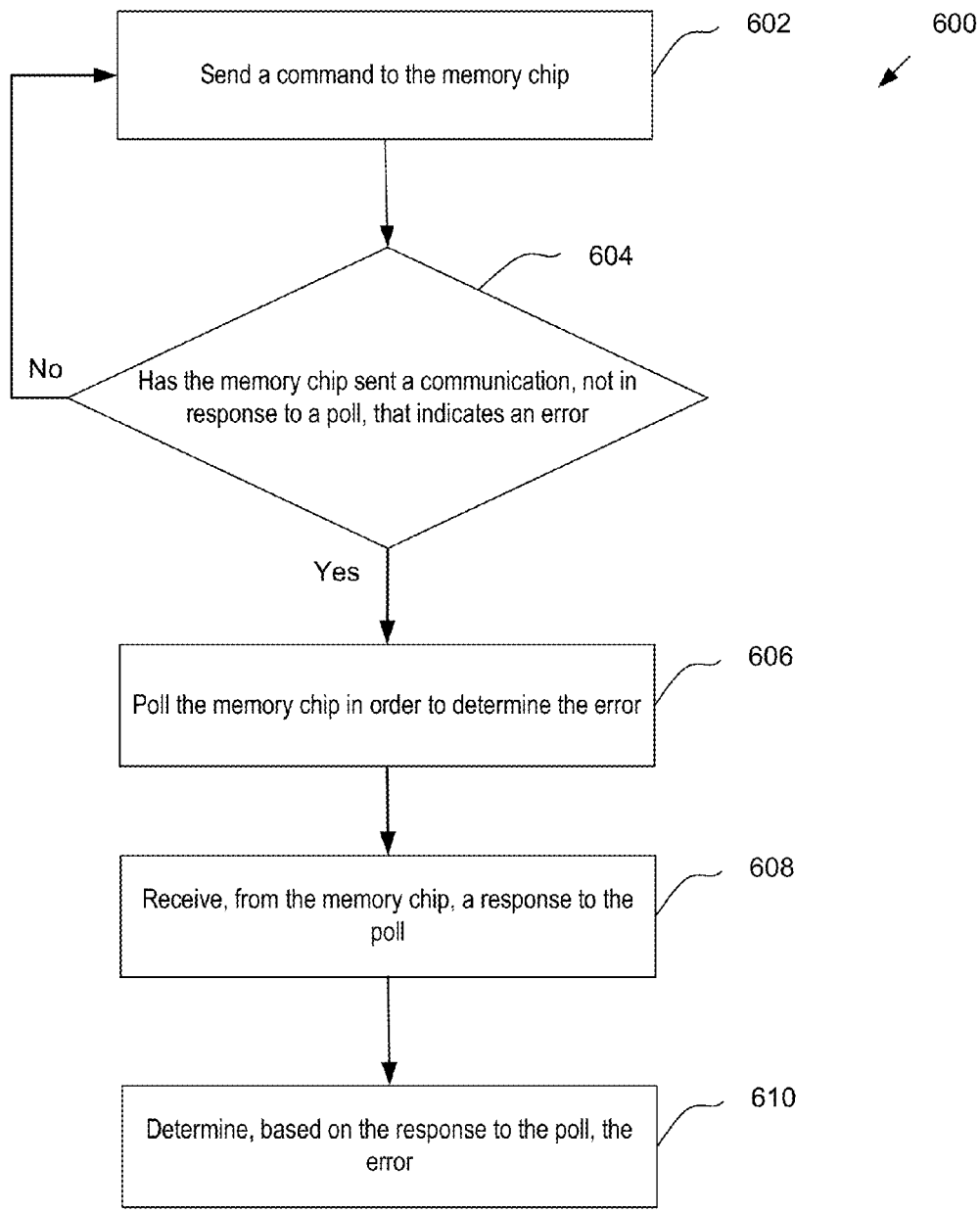
FIG. 6 illustrates a flow chart of an example of the memory system controller determining whether an error has occurred in executing a command by the memory chip.

FIG. 6 illustrates a flow chart 600 of an example of the controller 102 determining whether an error has occurred in executing a command by the non-volatile memory die 104. At 602, the controller 102 sends a command to the non-volatile memory die 104. At 604, the controller 102 determines whether the non-volatile memory die 104 has sent a communication, not in response to a poll, that indicates an error has occurred on the non-volatile memory die 104. As discussed above, the non-volatile memory die 104 may send a variety of communications that indicate an error (such as an error in executing a command sent from the controller 102) has occurred. One way is via the RDY/BSY line, such as discussed in more detail below with regard to FIG. 7. Another way is to determine whether the non-volatile memory die 104 has sent a communication, which is indicative that an error has occurred on the non-volatile memory die 104, via data lines $IO_0$-$IO_N$, such as disclosed above with respect to FIG. 2C. Still another way for the non-volatile memory die 104 to communicate an error to the controller 102 is for the non-volatile memory die 104 to send the error indication via a dedicated error communication line (e.g., separate from the RDY/BSY line).

In response to the controller 102 determining that no error has occurred, flow chart 600 may loop back to 602. In response to the controller 102 determining that an error has occurred, at 606, the controller 102 may poll the memory system controller 118 in order to determine the error. As discussed above, the controller 102 may poll the memory system controller 118 in a variety of ways. In one way, the controller 102 may poll for detailed status, such as illustrated in FIGS. 5A-B, in order to determine the error that has occurred. In another way, the controller 102 may poll for basic status in order to determine whether a command sent to the memory chip has been executed.

In response to sending the poll for detailed status, at 608, the controller 102 may receive from the memory system controller 118 a response to the poll. The response may include, for example, information as illustrated in FIGS. 5A-B. At 610, the controller 102 may determine the error that has occurred based on response to the poll. For example, the controller 102 may identify, based on the response to the poll, the command whose execution by the memory system controller 118 resulted in the error. As another example, the controller 102 may determine the stage of execution of the command at which the error occurred. The present examples are merely for illustration purposes.

Figure 7:
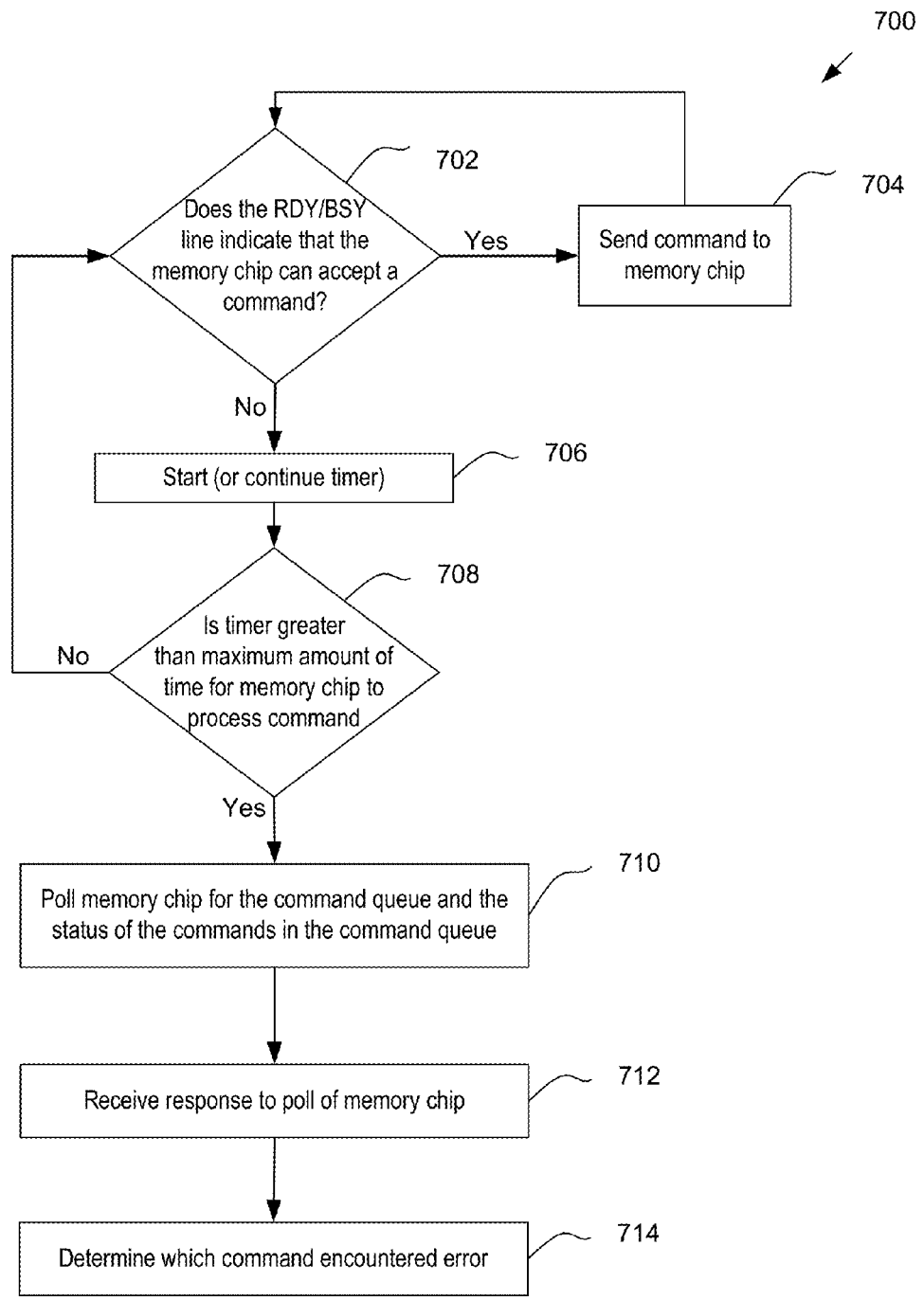
FIG. 7 illustrates a flow chart of an example of the memory system controller determining whether to send a command to the memory chip and determining whether an error has occurred in executing a command by the memory chip.

FIG. 7 illustrates a flow chart 700 of an example of the controller 102 determining whether to send a command to the memory system controller 118 and determining whether an error has occurred in executing a command by the non-volatile memory die 104. At 702, the controller 102 senses the RDY/BSY line to determine whether it indicates that the non-volatile memory die 104 can accept a command. In response to determining that the RDY/BSY line indicates that the non-volatile memory die 104 can accept a command, at 704, the controller 102 sends a command to the memory chip.

In response to determining that the RDY/BSY line indicates that the non-volatile memory die 104 cannot accept a command, at 706, the controller 102 starts a timer (or continues the timer if the timer is already started). For example, the controller 102 may start timer 111. At 708, the controller 102 determines whether the timer is greater than a maximum amount of time for the non-volatile memory die 104 to process a command. For example, the controller 102 may compare the timer with a static maximum amount of time (such as 20 mSec). Alternatively, the controller 102 may compare the timer with a dynamically set maximum amount of time. More specifically, the controller 102 may dynamically set the maximum amount of time based on the commands sent to the non-volatile memory die 104. For example, the controller 102 may use a look-up table to determine, based on the type of command sent to the memory chip, a typical time in which to execute the type of command.

In response to determining that the timer is less than the maximum amount of time for the non-volatile memory die 104 to process a command, the flow chart 700 loops back to 702. In response to determining that the timer is greater than the maximum amount of time for the non-volatile memory die 104 to process a command, at 710, the controller 102 polls the non-volatile memory die 104 for the command queue and the status of the commands in the command queue. At 712, the controller 102 receives the response to the poll, with the response providing information such as illustrated in FIGS. 5A-B. At 714, the controller 102 may determine which command encountered the error. Alternatively, or in addition, the controller 102 may determine the type of error that occurred when executing the command.

Apart from detecting errors in the non-volatile memory die 104, the controller 102 may control closeout of the command queue on the non-volatile memory die 104 in which all of the commands in the command queue are flushed. Command queue closeout may occur when the controller 102 no longer wishes to put any additional requests to the non-volatile memory die 104. After sending the command queue closeout command to the non-volatile memory die 104, the controller 102 may sense one or more interrupts to determine whether all of the commands have been flushed from the command queue.

In one embodiment, the non-volatile memory die 104 may be programmed to send an interrupt to inform the controller 102 every time a command in the command queue has completed execution by the non-volatile memory die 104. For example, the interrupts may be sent via the RDY/BSY line. The controller 102 may compare the number of interrupts with the number with the number of commands that are pending in the command queue. The controller 102 may determine the number of commands pending in the queue by requesting a detailed status in order to obtain the information as illustrated in FIG. 5A. In an alternative embodiment, the non-volatile memory die 104 may be programmed to send a single interrupt when the command queue has been flushed.

As discussed above, the command queue and the status associated with the commands in the command queue may be stored in status registers 153 of peripheral circuitry 141, such as a command queue/status cache. Further, as discussed above, the flash control logic 240 may communicate with multiple dice. The sizing of the command queue/status caches may be selected such that sufficient commands may be stored in the cache so that each die communicating with the memory chip controller may remain busy. In other words, the cache may be sized based on how many commands may be completed during the longest bus transaction, with optional additional factors such as a window skew factor for alignment of cached commands during a long bus transaction, and/or overhead to send the commands given a queue depth and die parallelism. More specifically, multiple die may share a common communication channel. For example, two individual die may share a common NAND bus. The two individual die may be in one package or may be in different packages. Because the bus is common, while communicating with one die, the memory system controller is unable to communicate with other die on the common bus.

The sizing of the command queue/status cache may be dependent on several variables, including any one, any combination, or all of the following:

$T_{Long}$: the time for the longest single (uninterruptable) data toggle operation given a bus frequency (toggle mode 200). As discussed above, this is accounted for because when one die is communicating with the memory chip controller, all other dice are blocked from transactions with the memory chip controller.

$T_{InternalShort}$: the shortest internally cached command that the NAND supports. For example, the shortest internally cached command may comprise a sense (read).

$T_{Cmd}$: the amount of time it takes for the memory system controller 118 to send a single command the memory chip 116.

N: number of die that share a common bus.

$W_f$: Window factor, which may account for a command skew during $T_{Long}$. $W_f$ may be set to 1.

The above variables may be used to determine the queue depth (the number of commands in the queue) by:

$$\text{QueueDepth} = (T_{Long}/T_{InternalShort}) + W_f * (T_{Long}/T_{InternalShort}) * (N-1) * (T_{Cmd}-T_{InternalShort}),$$

in which the following is assumed: $T_{Long}$=82 uS (TM200, 16 KB, single plane); $T_{InternalShort}$=30 uS; $W_f$=1; N=8; $T_{Cmd}$=1. Using these values, the queue depth=3.36. Given these parameters, the cache may be sized such that the queue depth=4. In this regard, the example parameters illustrate that a queue depth of 4 is sufficiently large to keep one die busy while doing a long transaction, such as a read or write transaction, with another die.

In the present application, semiconductor memory systems such as those described in the present application may include volatile memory systems, such as dynamic random access memory ("DRAM") or static random access memory ("SRAM") devices, non-volatile memory systems, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory system may have different configurations. For example, flash memory systems may be configured in a NAND or a NOR configuration.

The memory systems can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory system elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory systems in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory system level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory system level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory system levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory system levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory system levels. Alternatively, the memory elements may be coupled together to form a vertical NAND string that traverses across multiple horizontal memory system levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory system levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory system level of the array are typically formed on the layers of the underlying memory system levels of the array. However, layers of adjacent memory system levels of a monolithic three dimensional memory array may be shared or have intervening layers between memory system levels.

Then again, two dimensional arrays may be formed separately and then packaged together to form a non-monolithic memory system having multiple layers of memory. For example, non-monolithic stacked memories can be constructed by forming memory levels on separate substrates and then stacking the memory levels atop each other. The substrates may be thinned or removed from the memory system levels before stacking, but as the memory system levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory system.

Associated circuitry is typically required for operation of the memory elements and for communication with the memory elements. As non-limiting examples, memory systems may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional exemplary structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

What is claimed is:

1. An integrated circuit chip comprising:
   a memory;
   command receipt circuitry configured to receive commands from a controller of a memory system;
   command queue circuitry configured to rearrange the commands in a list of the commands in response to suspending execution of one of the commands in order for the list to be indicative of a rearranged order of execution of the commands; and
   poll response circuitry configured to send part or all of the list of commands in response to receipt of a poll command from the controller.

2. The integrated circuit chip of claim 1, further comprising command status circuitry configured to store a status associated with one or more commands in the list of commands.

3. The integrated circuit chip of claim 2, wherein the command status circuitry is configured to store the status of each of the commands in the list of commands; and wherein the poll response circuitry is further configured to send the status of each of the commands in the list of commands in response to receipt of the poll command from the controller.

4. An integrated circuit chip:
   a memory;
   command receipt circuitry configured to receive commands from a controller of a memory system;
   command queue circuitry configured to maintain a list of the commands;
   command pass indication circuitry configured to store a pass or fail indication of each of the commands in the list of commands; and
   poll response circuitry configured to send the pass or fail indication of each of the commands in the list of commands in response to receipt of a poll command from the controller.

5. An integrated circuit chip:
   a memory;
   command receipt circuitry configured to receive commands from a controller of a memory system;
   command queue circuitry configured to store a predetermined number of the commands sent from the controller, wherein the predetermined number is determined based on how many commands may be completed during a longest bus transaction with the controller of the memory system; and
   poll response circuitry configured to send, in response to receipt of a poll command from the controller, part or all of the commands maintained by the command queue circuitry.

6. The integrated circuit chip of claim 5, wherein the commands maintained by the command queue circuitry are for execution on a first die in the memory system;
   wherein the longest bus transaction comprises a longest time in which the controller communicates with another die in the memory system.

7. A controller for a memory system comprising:
   communication circuitry configured to communicate with one or more memory integrated circuit chips;
   command generation circuitry configured to generate and send, via the communication circuitry, one or more commands to a memory integrated circuit chip; and
   error determination circuitry configured to receive, via the communication circuitry, a communication indicative of an error and to determine, based on the communication, whether an error has occurred in execution of any of the one or more commands,
   wherein the communication is not in response to polling by the controller of the memory integrated circuit chip and comprises an indication whether at least a part of the memory integrated circuit chip is ready to accept an additional command.

8. The memory system controller of claim 7, wherein the error determination circuitry is configured to determine, based on the communication, whether the error has occurred by:
   determining whether the communication has been received for more than a predetermined period; and
   in response to determining that the communication has been received for more than the predetermined period, determining that the error has occurred.

9. The memory system controller of claim 7, further comprising interrupt circuitry configured to, responsive to receipt of the communication, interrupt processing of the controller.

10. The memory system controller of claim 7, further comprising poll circuitry configured to, in response to the error determination circuitry determining the error, poll the memory integrated circuit chip regarding the error.

11. The memory system controller of claim 10, further comprising error identification circuitry configured to, in response to the poll circuitry polling the memory integrated circuit chip regarding the error, receive an identification of the command that resulted in the error.

12. The memory system controller of claim 11, wherein the error identification circuitry is configured to receive the identification of the command that resulted in the error by:
receiving a list of commands in the queue of the memory integrated circuit chip, and a pass or failure indication for each of the commands in the list.

13. The memory system controller of claim 10, further comprising command queue circuitry configured to, in response to the poll circuitry polling the memory integrated circuit chip regarding the error, receive a list of commands in the queue of the memory integrated circuit chip.

14. An integrated circuit chip comprising:
a memory;
command receipt circuitry configured to receive a command from a controller of a memory system;
execution circuitry configured to execute the command received via the command receipt module;
error determination circuitry configured to determine an error in execution of the command; and
a communication generator configured to, in response to the error determination circuitry determining an error in execution of the command, generate and send a communication indicative to the controller that the error has occurred, the communication indicative of whether at least a part of the memory integrated circuit chip is ready to accept an additional command.

15. The integrated circuit chip of claim 14, further comprising at least one line configured to send the communication to indicate readiness to accept the additional command; and
wherein the communication, when sent on the at least one line for more than a predetermined time period, is indicative to the controller than the error has occurred.

16. The integrated circuit chip of claim 15, wherein the communication generator is configured to, in response to the error determination circuitry determining the error, maintain sending the communication on the at least one line regardless of readiness to accept the additional command.

17. The integrated circuit chip of claim 14, further comprising at least one communication line dedicated to transmitting the communication.

18. The integrated circuit chip of claim 14, further comprising a plurality of data lines; and
wherein the communication generator is configured to send the communication indicative to the controller that the error has occurred on one or more of the plurality of data lines.

* * * * *